(12) United States Patent
Rust et al.

(10) Patent No.: US 12,420,895 B2
(45) Date of Patent: Sep. 23, 2025

(54) SYSTEMS AND METHODS FOR UTILIZING NUCLEAR-BASED MARINE CRAFT TO GENERATE ELECTRICITY FOR EXTERNAL OR GRID USAGE

(71) Applicant: QUADRANT CLEAN TECH LTD., New York, NY (US)

(72) Inventors: Jedidiah Rust, Golden, CO (US); Ted Deinard, Greenwich, CT (US)

(73) Assignee: QUADRANT CLEAN TECH LTD., New York, NY (US)

( * ) Notice: Subject to any disclaimer, the term of this patent is extended or adjusted under 35 U.S.C. 154(b) by 0 days.

(21) Appl. No.: 18/927,423

(22) Filed: Oct. 25, 2024

(65) Prior Publication Data

US 2025/0196974 A1  Jun. 19, 2025

Related U.S. Application Data

(60) Provisional application No. 63/611,998, filed on Dec. 19, 2023.

(51) Int. Cl.
*B63B 35/44* (2006.01)
*B63B 27/00* (2006.01)
*B63H 21/18* (2006.01)
*B63H 23/02* (2006.01)
*B63H 23/34* (2006.01)
*F03D 9/25* (2016.01)
(Continued)

(52) U.S. Cl.
CPC .............. *B63B 35/44* (2013.01); *B63B 27/00* (2013.01); *B63H 21/18* (2013.01); *B63H 23/02* (2013.01); *B63H 23/34* (2013.01); *F03D 9/255* (2017.02); *H02K 7/116* (2013.01); *H02K 7/1823* (2013.01); *B63B 2035/4446* (2013.01); *B63B 2035/446* (2013.01); *F05B 2220/706* (2013.01)

(58) Field of Classification Search
CPC ...... H02K 7/116; H02K 7/1823; B63H 21/18; B63H 23/02; B63H 23/34; F03D 9/255; B63B 35/44; B63B 27/00; B63B 21/18
See application file for complete search history.

(56) References Cited

U.S. PATENT DOCUMENTS

2003/0222456 A1* 12/2003 Mikhall ................. F03D 15/10
290/1 R
2005/0012339 A1* 1/2005 Mikhail ................. H02P 9/105
290/44

(Continued)

*Primary Examiner* — Sean Gugger
(74) *Attorney, Agent, or Firm* — Hayes Soloway PC (57) ABSTRACT

Systems and methods for utilizing nuclear-based marine craft to generate electricity for external or grid usage are disclosed. In accordance with some embodiments, the system may include a nuclear-based marine craft having a propeller shaft and an electrical generator coupled external to the marine craft and configured to transmit generated electricity. In accordance with some other embodiments, the system may include a nuclear-based marine craft having a nuclear reactor and a turbine, a dock or barge having its own turbine and electrical generator, a steam outlet pipe connecting the nuclear reactor to the dock or barge turbine, and a steam inlet pipe connecting the dock or barge turbine back to the nuclear reactor, whereby heated steam from the nuclear reactor spins the dock or barge turbine, which then powers the electrical generator on the dock or barge to generates electricity.

17 Claims, 5 Drawing Sheets

(51) Int. Cl.
    *H02K 7/116*    (2006.01)
    *H02K 7/18*     (2006.01)

(56) References Cited

U.S. PATENT DOCUMENTS

2021/0288551 A1* 9/2021 Shin .................... H02K 7/1807
2022/0274677 A1* 9/2022 Chelaru .................. B63B 5/14

* cited by examiner

SYSTEMS AND METHODS FOR UTILIZING NUCLEAR-BASED MARINE CRAFT TO GENERATE ELECTRICITY FOR EXTERNAL OR GRID USAGE

CROSS-REFERENCE TO RELATED APPLICATIONS

This patent application claims the benefit of U.S. Provisional Patent Application No. 63/611,998, titled "Systems and Methods for Utilizing Nuclear-Based Marine Craft to Generate Electricity for External or Grid Usage," filed on Dec. 19, 2023, which is herein incorporated by reference in its entirety.

FIELD OF THE DISCLOSURE

The present disclosure relates to electricity generation and, more particularly, to the use of nuclear-based marine craft to generate electrical energy for external or grid usage.

BACKGROUND

The power generation system on a nuclear submarine, nuclear aircraft carrier, or other nuclear-based marine craft utilizes a nuclear reactor to provide propulsion. Typically, the nuclear reactor is utilized to generate electricity that powers electric motors connected to a propeller shaft or to produce steam that drives steam turbines. In any case, the nuclear reactor can produce a large amount of power and run for an extended period before refueling is necessary.

SUMMARY

The subject matter of this application may involve, in some cases, interrelated products, alternative solutions to a particular problem, and/or a plurality of different uses of a single system or article.

A first example embodiment provides a system. The system includes a nuclear-based marine craft including a propeller shaft. The system further includes a naval nuclear electrical generator mounted external to the marine craft and operatively coupled to the propeller shaft, wherein the naval nuclear electrical generator is configured to generate electricity via rotation of the propeller shaft. The system further includes an electrical output cable connected to the naval nuclear electrical generator and configured to transmit generated electricity for external or grid usage.

In some cases of the first example embodiment, the marine craft includes at least one of a submarine, an aircraft carrier, and a destroyer warship. In some cases of the first example embodiment, the system further includes a mechanical coupler joining the propeller shaft and a shaft of the naval nuclear electrical generator. In some cases of the first example embodiment, the system further includes a gearbox operatively coupled between the propeller shaft and a shaft of the naval nuclear electrical generator and configured to change a rotational speed of the propeller shaft.

In some cases of the first example embodiment, the system further includes a bracket assembly mounted to the marine craft at a proximal end of the bracket assembly and operatively coupled with the naval nuclear electrical generator at a distal end of the bracket assembly, wherein the bracket assembly is configured to secure the naval nuclear electrical generator in a spaced relationship with the marine craft such that a shaft of the naval nuclear electrical generator is substantially aligned with the propeller shaft. In some such instances, the bracket assembly further includes one or more pad eyes mounted to the marine craft. In some other such instances, the proximal end of the bracket assembly is secured to one or more fins of the marine craft.

In some cases of the first example embodiment, the system further includes a radial clamping system removably coupled with the marine craft. The system then further includes at least one clamp arm secured to the radial clamping system at a proximal end of the radial clamping system and operatively coupled to the naval nuclear electrical generator at a distal end of the at least one clamp arm, wherein the at least one clamp arm is configured to secure the naval nuclear electrical generator in a spaced relationship with the marine craft such that a shaft of the naval nuclear electrical generator is substantially aligned with the propeller shaft.

In some cases of the first example embodiment, the system further includes a waterproof enclosure, wherein at least a portion of the naval nuclear electrical generator is enclosed within the waterproof enclosure.

In some cases of the first example embodiment, the system further includes a wind turbine configured to generate electricity. The system then further includes an electrical junction.

The system then further includes a shore electrical cable electrically coupled with the electrical junction and configured to provide generated electricity for external or grid usage. In such cases, the naval nuclear electrical generator, the wind turbine, and the electrical junction are in electrical communication with each other to provide consistent power generation.

A second example embodiment provides a system. The system includes a nuclear-based marine craft including: a nuclear reactor; and a turbine. The system further includes a dock or barge including: a dock or barge turbine; and an electrical generator configured to generate electricity via rotation of a shaft of the dock or barge turbine. The system further includes a steam outlet pipe configured to deliver heated steam from the nuclear reactor to the dock or barge turbine. The system further includes a steam inlet pipe configured to return expended steam from the dock or barge turbine to the nuclear reactor.

A third example embodiment provides a method. The method includes providing a nuclear-based marine craft including: a propeller shaft; and a propeller. The method further includes providing an electrical generator including: a shaft; and an electrical output cable coupled with the electrical generator and configured to transmit generated electricity for external or grid usage. The method further includes removing the propeller from the marine craft. The method further includes mounting the electrical generator external to the marine craft. The method further includes generating electricity with the electrical generator via rotating the propeller shaft.

In some cases of the third example embodiment, the method further includes welding or otherwise securing a proximal end of a bracket assembly to the marine craft. The method then further includes securing a distal end of the bracket assembly to the electrical generator, thereby securing the electrical generator in a spaced relationship with the marine craft such that a shaft of the electrical generator is substantially aligned with the propeller shaft.

In some cases of the third example embodiment, the method further includes removably securing a radial clamping system to the marine craft. The method then further includes securing a proximal end of clamp arms to the radial clamping system. The method then further includes securing a distal end of the clamp arms to the electrical generator, thereby securing the electrical generator in a spaced relationship with the marine craft such that a shaft of the electrical generator is substantially aligned with the propeller shaft.

In some cases of the third example embodiment, the method further includes mechanically coupling the propeller shaft and the shaft of the electrical generator with a mechanical coupler disposed therebetween.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Systems and techniques for utilizing nuclear-based marine craft to generate electricity for external or grid usage are disclosed. In accordance with some embodiments, the system may include a nuclear-based marine craft having a propeller shaft and an electrical generator coupled external to the marine craft and configured to transmit generated electricity. In accordance with some other embodiments, the system may include a nuclear-based marine craft having a nuclear reactor and a turbine, a dock or barge having its own turbine and electrical generator, a steam outlet pipe connecting the nuclear reactor to the dock or barge turbine, and a steam inlet pipe connecting the dock or barge turbine back to the nuclear reactor, whereby heated steam from the nuclear reactor spins the dock or barge turbine, which then powers the electrical generator on the dock or barge to generates electricity. Numerous configurations and variations will be apparent in light of this disclosure.

General Overview

Most large naval vehicles are equipped with high-power propulsion systems. While some are powered with diesel, many of the largest marine vehicles are nuclear-powered. These nuclear-powered craft can generate substantial thermal power that ranges, for example, from 20-500 MW. The onboard nuclear reactors take thermal energy and convert it to steam energy that then runs through a steam turbine converting it into mechanical rotational energy. Most marine craft then take the steam turbine output power and run it through a gearbox and to a propeller at the distal end of the craft. With effective steam turbines and electrical generators, each vessel can convert about 30% of the thermal energy into electrical energy. For example, a nuclear submarine with about 220 MW (thermal) could generate about 70 MW (electrical) through a steam-mechanical-electrical generator transformation.

As will be appreciated, the natural environment continues to be harmed by dependence on burning fossil fuels for electricity production. At the same time, aging submarines and other nuclear-based military vessels lie idle once deemed as having insufficient readiness for combat.

Thus, and in accordance with some embodiments of the present disclosure, systems and techniques for utilizing nuclear-based marine craft to generate electricity for external or grid usage are disclosed. In accordance with some embodiments, the system may include a nuclear-based marine craft having a propeller shaft and an electrical generator coupled external to the marine craft and configured to transmit generated electricity. In accordance with some other embodiments, the system may include a nuclear-based marine craft having a nuclear reactor and a turbine, a dock or barge having its own turbine and electrical generator, a steam outlet pipe connecting the nuclear reactor to the dock or barge turbine, and a steam inlet pipe connecting the dock or barge turbine back to the nuclear reactor, whereby heated steam from the nuclear reactor spins the dock or barge turbine, which then powers the electrical generator on the dock or barge to generates electricity.

In accordance with some embodiments, techniques disclosed herein may be used, in part or in whole, to convert existing nuclear naval ships into power generating factories. This, in turn, can reduce the impact on the environment by reducing dependence on fossil fuel-based power generation. In addition, techniques disclosed herein may allow, in accordance with some embodiments, aged submarines to be put to further work, utilizing their nuclear cores even after such vessels have been deemed insufficient for combat. A further advantage provided by techniques disclosed herein may flow, in accordance with some embodiments, from the fact that nuclear marine crafts are capable of being run as "load following," allowing them to readily adjust output as demand increases or decreases. Thus, as will be appreciated, techniques disclosed herein may be utilized, in accordance with some embodiments, to provide a power generation system that is ideal for managing peak demand on an electrical grid. Beyond power-related benefits, there also may be other benefits, including allowing government agencies, such as the U.S. Department of Energy and the U.S. Department of Defense, to dramatically reduce and delay the teardown costs of retiring nuclear crafts while the nuclear core is still powerful.

Of further note, submarines or large marine crafts normally have access to most major ports globally. This gives them a unique ability to provide power at any costal city or large river. With a quick disconnect system provided as described herein, these nuclear-powered submarines can rapidly provide critical electrical input to an electrical grid at a given coastal location. Also, craft modified as described herein can remain on the surface in a port or can be submerged if there are concerns of storms or security. Additionally, craft modified as described herein can be moved about stealthily, making detection (e.g., in a wartime situation) difficult.

With the ability for nuclear submarines to remain underwater in a self-sustaining system for very long periods of time, there is an ability to position these crafts underwater, thus making them a secure nuclear facility that cannot be accessed by unauthorized people. Additionally, with a system retrofitted with remote monitoring and remote buoyancy call options, these craft could be held underwater without security or operational personnel. When service or maintenance is needed, the remote buoyancy would be activated, and surface personnel would then access the craft.

Also, most nuclear submarines are equipped with large missile systems and are controlled closely by government bodies. For short-term power campaigns, the government or navy would have to staff and secure the crafts for national security reasons like what occurs during normal dry dock maintenance or port-based activities. In case of retiring submarines or crafts, the missile tubes could be removed or rendered inactive prior to deployment as an energy generator.

System Architectures and Operation

The present disclosure describes several ways to repurpose nuclear-based watercraft to generate clean energy. In one approach, a direct drive system may be attached to a distal end of a nuclear-based marine craft. In another approach, a steam pipe connection system to a dock or barge may be provided. It should be noted at the outset that, although a submarine is used as a primary example throughout this disclosure, techniques disclosed herein can be applied for other large, surface-based naval craft, such as, for example, an aircraft carrier or destroyer warship, among other options.

Figure 1:
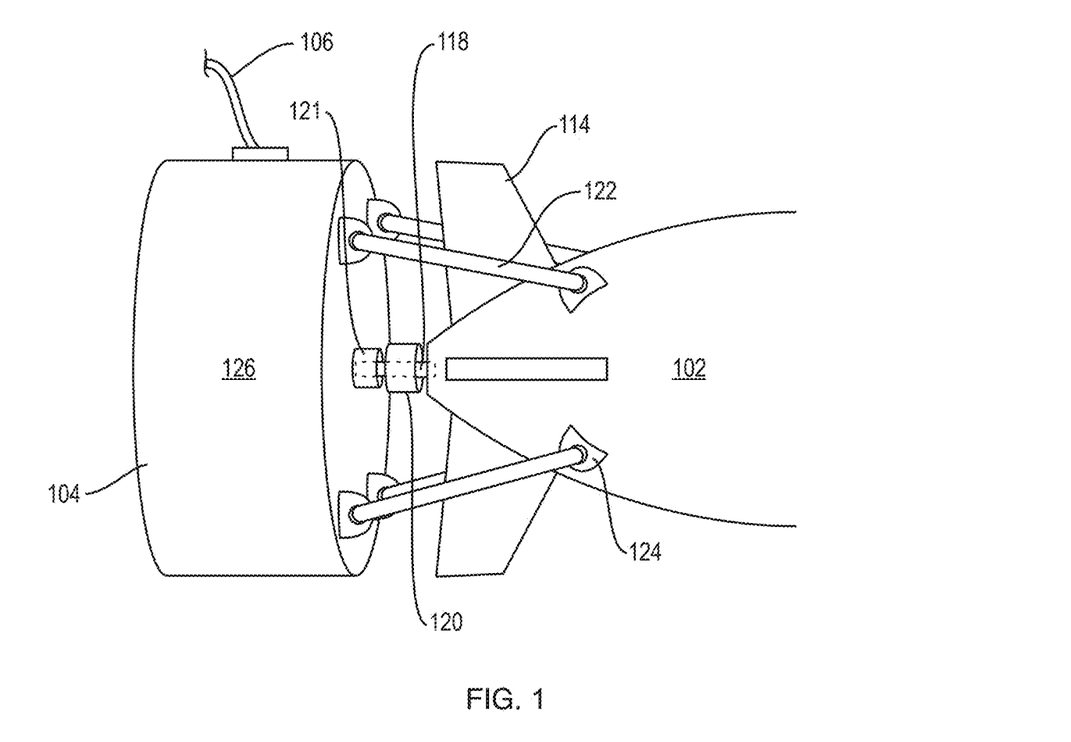
FIG. 1 is a side elevation view of a nuclear-based marine craft having an electrical generator attached externally to the nuclear-based marine craft with a bracket assembly, in accordance with an embodiment of the present disclosure.

FIG. 1 is a side elevation view of the nuclear-based marine craft 102 having an electrical generator 104 attached externally to the nuclear-based marine craft 102 with a bracket assembly 122 in accordance with an embodiment of the present disclosure. External attachment may be provided via bracket assembly 122 and, for example, one or more pad eyes 124 welded or otherwise mounted to the marine craft. This is an example of a direct-drive system, as described above. Generator 104 may be configured to allow for variable-speed power generation and load following by nuclear-based marine craft 102 using a gearbox/transmission 121 (discussed below). Generator 104 may have an outbound lead or plug 106 for external usage or to connect to a nearby electrical grid system.

Bracket assembly 122 may be welded (or otherwise suitably mounted) to nuclear-based marine craft 102 at a proximal end of bracket assembly 122 and secured to generator 104 at a distal end. Bracket assembly 122 may be configured to secure generator 104 in a spaced relationship with nuclear-based marine craft 102 such that a shaft of generator 104 is substantially aligned with propeller shaft 118 so that generator 104 can be powered by rotation of propeller shaft 118. Bracket assembly 122 also may include one or more pad eyes 124 welded (or otherwise suitably mounted) to nuclear-based marine craft 102. Brackets 122 and/or pad eyes 124 may be disposed on the outside of nuclear-based marine craft 102, for instance, at points next to structural hub members. Alternatively, bracket assembly 122 may be secured to any of the craft's one or more fins 114 near their base, depending on torque loading.

A mechanical coupler 120 also may join propeller shaft 118 and a shaft of electrical generator 104. Coupler 120 may be, for example, a Lovejoy® coupling manufactured by Lovejoy, Inc., which is a Timken Company. Additionally (or alternatively), specialized couplings designed to deal with harmonics in power generation may be utilized.

The system also may include a gearbox/transmission 121 operatively coupled between propeller shaft 118 and a shaft of generator 104. Depending on generator 104, optimum speed and additional gearing may be added to match a marine craft's optimum output rate in revolutions per minute (RPM) to an optimum input generator RPM. Gearbox/transmission 121 also can be disposed in locations other than that shown in FIG. 1. For instance, gearbox/transmission 121 can be disposed on propeller shaft 118, on the shaft of generator 104, between propeller shaft 118 and generator shaft, or at different positions in the assembly relative to coupler 120.

In some cases, generator 104 may be enclosed, in part or in whole, within a waterproof enclosure system 126. In some instances, waterproof enclosure system 126 also may enclose, in part or in whole, gearbox/transmission 121. Waterproof enclosure system 126 may be constructed of steel or stainless-steel or other submersible-grade enclosure material. In at least some cases, a target goal of having generator 104 assembled to waterproof enclosure system 126 may be to achieve substantially neutral buoyancy when submersed in seawater.

When not in use, generator 104 may be disconnected and either stored or transported via truck or barge to another location when needed. Generator 104 may be disconnected, and propeller 116 may be re-installed, allowing nuclear-based marine craft 102 to return to service or to move larger distances if needed.

Figure 2:
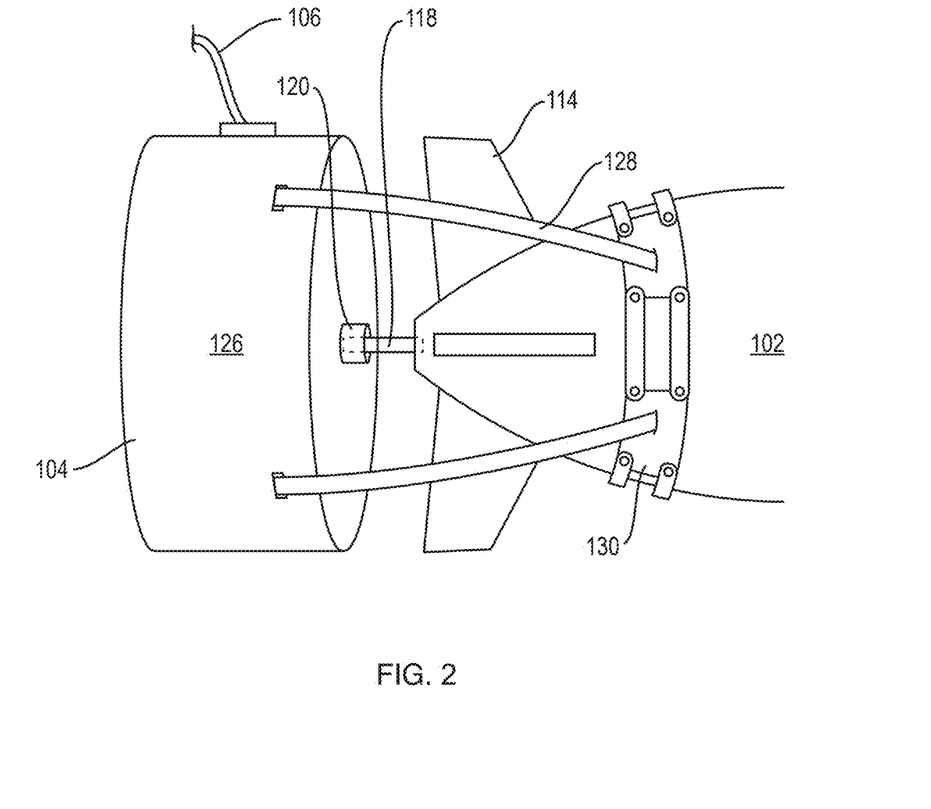
FIG. 2 is a side elevation view of the nuclear-based marine craft of FIG. 1 having an electrical generator attached to the nuclear-based marine craft with a radial clamping system and clamp arms, in accordance with an embodiment of the present disclosure.

FIG. 2 is a side elevation view of nuclear nuclear-based marine craft 102 of FIG. 1 having an electrical generator 104 attached to nuclear-based marine craft 102 with a radial clamping system 130 and clamp arms 128, in accordance with an embodiment of the present disclosure. As will be appreciated in light of this disclosure, radial clamping system 130 and clamp arms 128 may be utilized as an alternative to bracket assembly 122, at least in some instances. In lieu of brackets, a hydraulic or mechanical clamping system may be mounted around the periphery of nuclear-based marine craft 102, allowing for quicker installation and release. Also, such an approach may render the addition of any brackets to nuclear-based marine craft 102 unnecessary, which may improve stealth and/or flow properties. FIG. 2 is an example of a direct-drive system, as described herein.

Radial clamping system 130 may be removably secured to nuclear-based marine craft 102. Clamp arms 128 may be secured to radial clamping system 130 at a proximal end and secured to generator 104 at a distal end. Radial clamping system 130 and clamp arms 128 may be configured to secure generator 104 in a spaced relationship with nuclear-based marine craft 102 such that a shaft of generator 104 is substantially aligned with propeller shaft 118. Gearbox/transmission 121, shown in FIG. 1, also can be used in the arrangement shown in FIG. 2.

Figure 3:
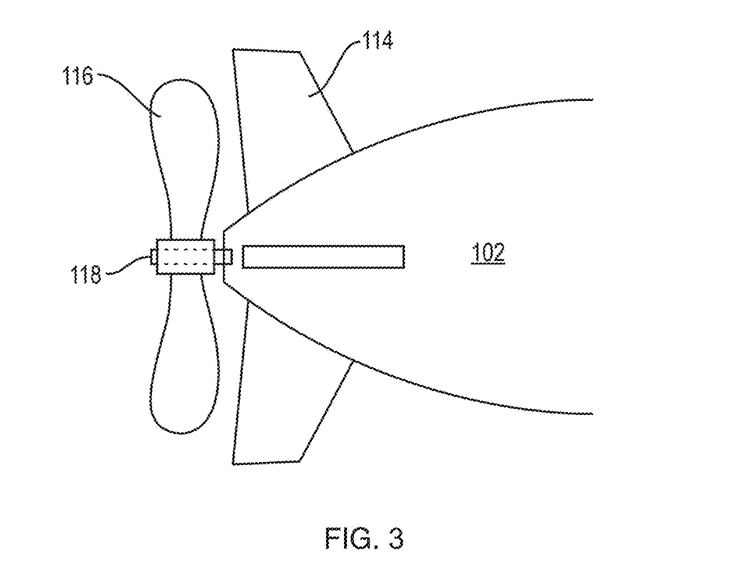
FIG. 3 is a side elevation view of a nuclear-based marine craft and propeller on a propeller shaft, in accordance with an embodiment of the present disclosure.

FIG. 3 is a side elevation view of a nuclear-based marine craft 102 and propeller 116 on a propeller shaft 118 in accordance with an embodiment of the present disclosure.

Figure 4:
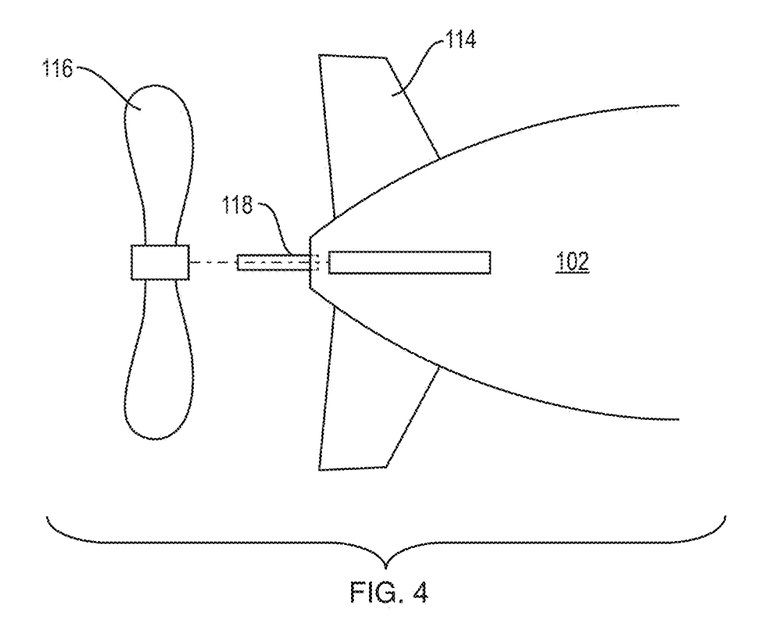
FIG. 4 is a side elevation view of the nuclear-based marine craft of FIG. 3 after the propeller has been removed, in accordance with an embodiment of the present disclosure.

FIG. 4 is a side elevation view of the nuclear-based marine craft 102 of FIG. 3 after the propeller 116 has been removed, in accordance with an embodiment of the present disclosure.

Figure 5:
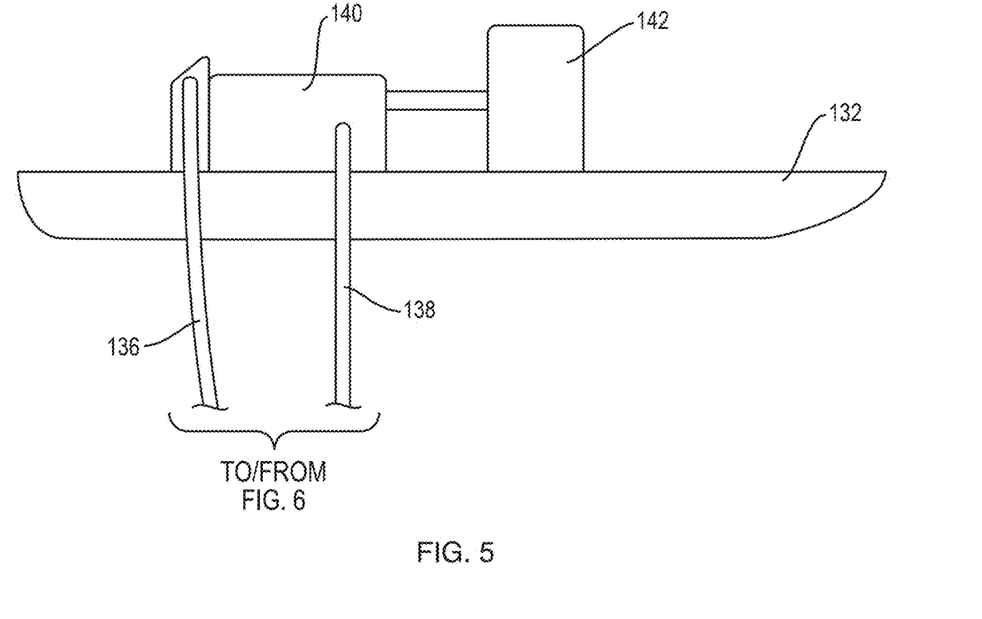
FIG. 5 is a side elevation view of a dock or barge, in which a nuclear reactor of the nuclear-based marine craft of FIG. 6 supplies heated steam to a dock or barge turbine that makes electricity with a generator on the dock or barge, in accordance with an embodiment of the present disclosure.
Figure 6:
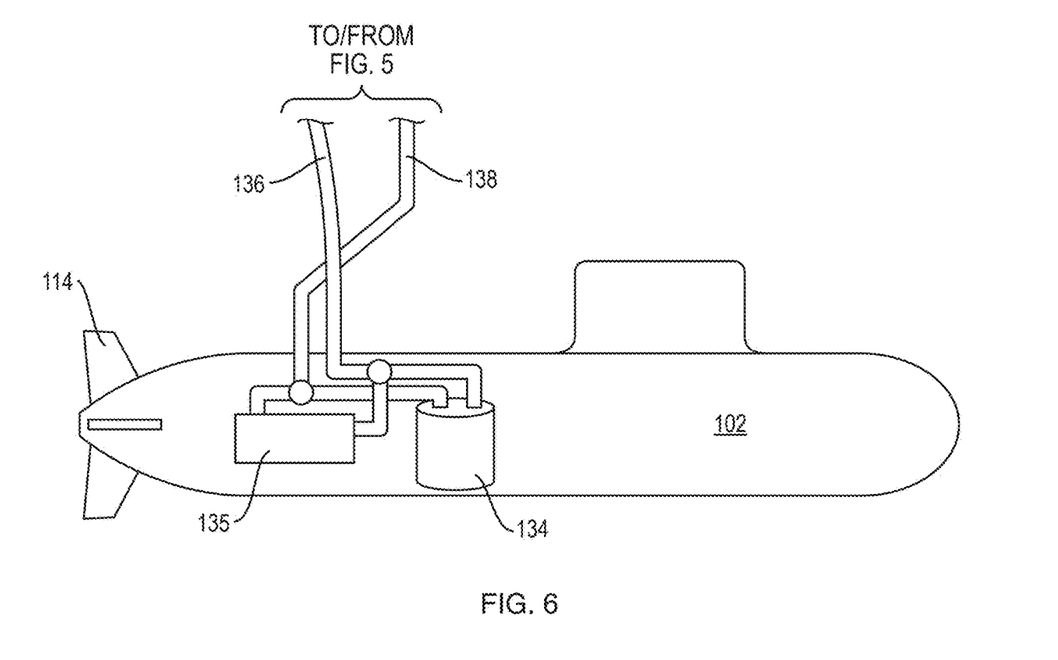
FIG. 6 is a side view of a nuclear-based marine craft supplying heated steam to the dock or barge shown in FIG. 5 in accordance with an embodiment of the present invention.

FIG. 5 and FIG. 6 are side elevation views of a nuclear-based marine craft 102 and a dock or barge 132, in which a nuclear reactor 134 of nuclear-based marine craft 102 supplies heated steam to a dock or barge turbine 140 that makes electricity with a generator 142 on the dock or barge in accordance with an embodiment of the present disclosure. This presents a second way to re-purpose a nuclear-based craft to generate clean energy. As can be seen in FIGS. 5 and 6, a steam pipe connection system 136, 138 connects to dock or barge 132. Reference to the term "dock" means that turbine 140 and/or generator 142 can be on land or land-based. Nuclear-based marine craft 102 may be modified to take steam directly from its nuclear reactor 134 to a land or barge-based turbine system 140 for power generation with dock or barge generator 142, bypassing the marine craft's onboard turbine system 135.

In some other cases, thermal energy may be transferred off nuclear-based marine craft 102 directly from steam outflow lines 136, 138. This approach may require dry dock modification and wall/hull penetration to run steam lines off nuclear-based marine craft 102 to either a barge or dock-based turbine 140. This approach also may restrict the reusability and movement of nuclear-based marine craft 102, as the associated piping may be generally fixed or inflexible. However, this approach allows for the bypass of internal steam turbine system 135 and provides for use of an outboard steam turbine system 140. As will be appreciated in light of this disclosure, this may be beneficial in cases in which onboard steam turbine 135 might be broken or highly inefficient but nuclear reactor 134 is still viable.

Dock or barge turbine 140 is in operative communication, such as via a drive shaft, with a dock or barge electrical generator 142. The dock or barge may be a floating drydock or other type of dock and/or barge as those terms are commonly used. Generator 142 may be configured to generate electricity by rotation of a shaft of turbine 140. As shown in FIGS. 5 and 6, the system may include a steam outlet pipe 136 having a proximal end in communication with nuclear reactor 134 and a distal end in communication with dock or barge turbine 140, and may be configured to deliver heated steam from nuclear reactor 134 to dock or barge turbine 140. Furthermore, the system may include a steam inlet pipe 138 having a proximal end in communication with dock or barge turbine 140 and a distal end in communication with nuclear reactor 134, configured to return expended steam from dock or barge turbine 140 to nuclear reactor 134. In some cases, steam outlet pipe 136 and/or steam inlet pipe 138 also can be in operative communication with nuclear craft turbine 135, as schematically shown in FIGS. 5 and 6.

Figure 7:
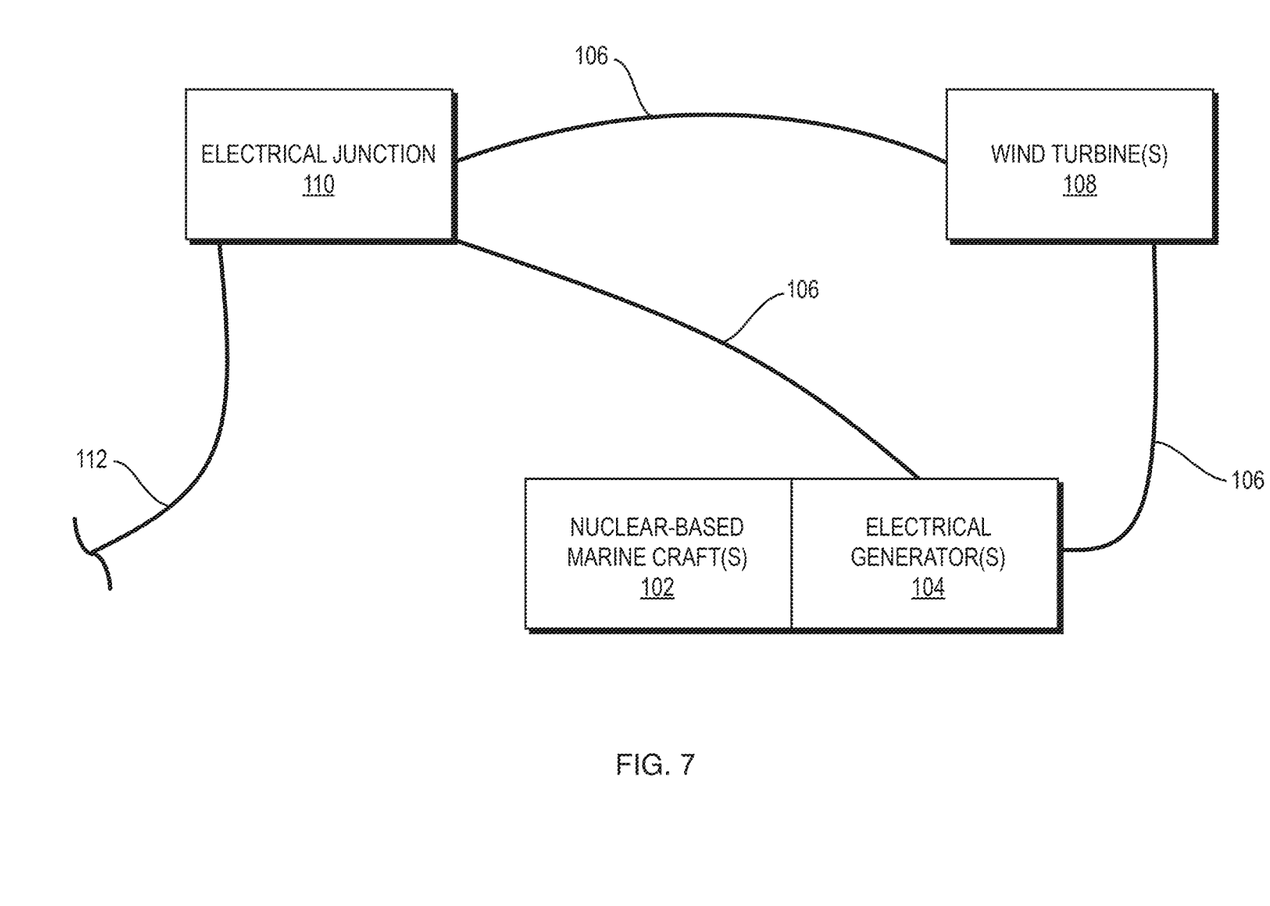
FIG. 7 is a schematic view of a system that uses nuclear-based marine craft for generating electricity and transmitting the electricity for external or grid usage via offshore wind power generation infrastructure, in accordance with an embodiment of the present disclosure.

FIG. 7 is a schematic view of a system that uses a nuclear-based marine craft 102 for generating electricity and transmitting the electricity for external or grid usage via offshore wind power generation infrastructure in accordance with an embodiment of the present disclosure. As shown, nuclear-based marine craft 102 (e.g., such as a submarine) could park offshore near existing windfarms including wind turbines 108, providing a "load following" power source to the naturally variable windfarms, thereby compensating for lower power output during calm weather and reducing nuclear power when its windy. Also, this may allow for the utilization of existing underwater transmission lines such as an electrical output cable 106 and shore electrical cable 112 and remove nuclear-based marine craft 102 from nearshore security concerns. For example, one or more nuclear-based marine crafts 102 may have electrical generators 104 externally secured to them. Electrical output cables may be in communication with windfarm turbines 108 and an electrical junction structure 110. A shore electrical cable 112 may lead from junction 110 and supply electricity for external or electrical grid usage.

Methodologies

As noted above, the present disclosure further includes description of methods for utilizing nuclear-based marine craft to generate electricity for external or grid usage are described as follows. The methods each include the steps of providing a nuclear-based marine craft 102, providing an electrical generator 104, 142 external to nuclear-based marine craft 102, providing an electrical output cable 106 coupled with generator 104, 142 and configured to transmit generated electricity for external or grid usage, and generating electricity with electrical generator 104, 142 by operation of nuclear-based marine craft 102.

A first method may include providing a nuclear-based marine craft 102 including a propeller shaft 118 and a propeller 116 as shown in FIG. 3, and providing an electrical generator 104 including a shaft and an electrical output cable 106 attached to the generator 104 and configured to transmit generated electricity. The first method further may include removing propeller 108 from nuclear-based marine craft 102 as shown in FIG. 4, securing generator 104 external to nuclear-based marine craft 102, and generating electricity with generator 104 by rotating propeller shaft 118.

Generator 104 may be mounted and secured external to nuclear-based marine craft 102, for example, by welding (or other suitable securing method) such as those discussed above with respect to FIGS. 1-2. In accordance with some embodiments, brackets may be welded (or otherwise suitably mounted) to the exterior of nuclear-based marine craft 102 at point(s) next to structural hub members (e.g., as generally shown in FIG. 1) or connected to one or more fins 114 near their base depending on torque loading. In further detail, the method may include welding (or other suitable mounting method) a proximal end of a bracket assembly 122 to nuclear-based marine craft 102 and securing a distal end of that bracket assembly 122 to generator 104, such that generator 104 is secured in a spaced relationship with nuclear-based marine craft 102 and such that a shaft of generator 104 is substantially aligned with propeller shaft 118. Pad eyes 124 may be welded or otherwise mounted on nuclear-based craft 102 for securing the proximal end of bracket assembly 122 to nuclear-based marine craft 102.

In accordance with another embodiment, a mechanical or hydraulic clamping system may be mounted around a periphery of nuclear-based marine craft 102, which may allow for a quicker installation and release than, for instance, a welding-based approach. Also, such a method may avoid the necessity of any brackets or pad eyes having to be added by welding, for example, to nuclear-based marine craft 102, which could affect stealth or flow properties. With that, the clamping-based method may include removably securing a radial clamping system 130 to nuclear-based marine craft 102, securing a proximal end of clamp arms 128 to radial clamping system 130, and securing a distal end of clamp arms 128 to generator 104, such that generator 104 is secured in a spaced relationship with nuclear-based marine craft 102 and a shaft of generator 104 is substantially aligned with propeller shaft 118.

A second example method may employ a different manner of repurposing nuclear reactors to generate clean energy: providing a steam pipe connection system from nuclear-based marine craft 102 to a dock or barge. The method may include providing a nuclear-based marine craft 102 including a nuclear reactor 134 and a turbine 135. The method further may include providing a dock or barge 132 that has a dock or barge turbine 140 in operative communication (e.g., such as via a drive shaft) with a dock or barge electrical generator 142. Generator 142 may be configured to generate electricity by rotation of a shaft of turbine 140. The method also may include providing a steam outlet pipe 136 having a proximal end in communication with nuclear reactor 134 and a distal end in communication with turbine 140, wherein steam outlet pipe 136 may be configured to deliver heated steam from nuclear reactor 134 to turbine 140. Furthermore, the method may include providing a steam inlet pipe 138 having a proximal end in communication with turbine 140 and a distal end in communication with nuclear reactor 134, wherein steam inlet pipe 138 may be configured to return expended steam from turbine 140 to marine craft reactor 134. Steam outlet pipe 136 and/or steam inlet pipe 138 also can be in operative communication with turbine 135, as generally shown in FIGS. 5 and 6.

In operation, nuclear reactor 134 may provide heated steam to steam outlet pipe 136 and, in turn, to turbine 140 of dock or barge 132. The heated steam may rotate the turbine shaft and, in turn, the shaft of generator 142 to generate electricity. The generated electricity then may be transmitted for external or grid usage. Expended steam may be returned via steam inlet pipe 138 to nuclear reactor 134 for reuse.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A system for utilizing nuclear-based marine craft to generate electricity for external or grid usage, the system comprising:
a nuclear-based marine craft comprising a propeller shaft;
an electrical generator mounted external to the marine craft and operatively coupled to the propeller shaft, wherein the electrical generator is configured to generate electricity via rotation of the propeller shaft;
at least one electrical output cable connected to the electrical generator and configured to transmit generated electricity for external or grid usage; and
a bracket assembly mounted to the marine craft at a proximal end of the bracket assembly and operatively coupled with the electrical generator at a distal end of the bracket assembly, wherein the bracket assembly is configured to secure the electrical generator in a spaced relationship with the marine craft such that a shaft of the electrical generator is substantially aligned with the propeller shaft.

2. The system of claim 1, wherein the nuclear-based marine craft comprises at least one of a submarine, an aircraft carrier, and a destroyer warship.

3. The system of claim 1, further comprising a mechanical coupler joining the propeller shaft and a shaft of the electrical generator.

4. The system of claim 1, further comprising a gearbox operatively coupled between the propeller shaft and a shaft of the electrical generator and configured to change a rotational speed provided by the propeller shaft to the shaft of the electrical generator.

5. The system of claim 1, wherein the bracket assembly further comprises one or more pad eyes mounted to the marine craft and configured for mounting the bracket assembly to the marine craft.

6. The system of claim 1, wherein the proximal end of the bracket assembly is secured to one or more fins of the marine craft.

7. The system of claim 1, further comprising a waterproof enclosure, wherein at least a portion of the electrical generator is enclosed within the waterproof enclosure.

8. The system of claim 7, wherein the waterproof enclosure together with the electrical generator are substantially neutrally buoyant in seawater.

9. The system of claim 1, further comprising:
a wind turbine configured to generate electricity from wind and electrically coupled to the electrical generator by the at least one electrical output cable;
an electrical junction electrically coupled to at least one of the wind turbine and the electrical generator by the at least one electrical output cable; and
a shore electrical cable electrically coupled with the electrical junction and configured to provide generated electricity for external or grid usage.

10. A system for utilizing nuclear-based marine craft to generate electricity for external or grid use, the system comprising:
a nuclear-based marine craft comprising:
a nuclear reactor; and
a marine craft turbine;
a dock or barge comprising:
a dock or barge turbine; and
an electrical generator configured to generate electricity via rotation of a shaft of the dock or barge turbine for external or grid use;
a steam outlet pipe configured to deliver heated steam from the nuclear reactor to the dock or barge turbine; and
a steam inlet pipe configured to return expended steam from the dock or barge turbine to the nuclear reactor.

11. A method of utilizing a nuclear-based marine craft to generate electricity for external or grid usage, the method comprising:
providing a nuclear-based marine craft;
the nuclear-based marine craft comprising:
a propeller shaft; and
a propeller;
removing the propeller from the marine craft;
providing an electrical generator external to the nuclear-based marine craft; the electrical generator comprising a shaft;

mounting the electrical generator external to the marine craft by:
  securing a proximal end of a bracket assembly to the marine craft; and
  securing a distal end of the bracket assembly to the electrical generator, such that the electrical generator is secured in a spaced relationship with the marine craft and the shaft of the electrical generator is substantially aligned with the propeller shaft;
providing an electrical output cable coupled with the electrical generator and configured to transmit generated electricity for external or grid usage; and
generating electricity with the electrical generator by operation of the nuclear-based marine craft by rotating the generator shaft with the propeller shaft.

12. The method of claim 11 further comprising:
mechanically coupling the propeller shaft and the shaft of the electrical generator with a mechanical coupler disposed therebetween.

13. The method of claim 11, the marine craft comprising at least one of a submarine, an aircraft carrier, and a destroyer warship.

14. The method of claim 11, further comprising:
providing a wind turbine configured to generate electricity from wind and electrically coupled to the electrical generator by the at least one electrical output cable;
providing an electrical junction electrically coupled to at least one of the wind turbine and electrical generator by the at least one electrical output cable; and
providing a shore electrical cable electrically coupled with the electrical junction and configured to provide generated electricity for external or grid usage.

15. A method of utilizing a nuclear-based marine craft to generate electricity for external or grid usage, the method comprising:
  providing a nuclear-based marine craft;
  providing an electrical generator external to the nuclear-based marine craft;
  providing an electrical output cable coupled with the electrical generator and configured to transmit generated electricity for external or grid usage; and
  generating electricity with the electrical generator by operation of the nuclear-based marine craft, wherein:
  the nuclear-based marine craft comprises a nuclear reactor; and
  the method further comprises:
    providing a dock or barge comprising:
      a dock or barge turbine; and
      the electrical generator disposed on the dock or barge and configured to generate electricity via rotation of a shaft of the dock or barge turbine for external or grid use;
    providing a steam outlet pipe configured to deliver heated steam from the nuclear reactor to the dock or barge turbine; and
    providing a steam inlet pipe configured to return expended steam from the dock or barge turbine to the nuclear reactor.

16. A system for utilizing nuclear-based marine craft to generate electricity for external or grid usage, the system comprising:
  a nuclear-based marine craft comprising a propeller shaft;
  an electrical generator mounted external to the marine craft and operatively coupled to the propeller shaft, wherein the electrical generator is configured to generate electricity via rotation of the propeller shaft;
  at least one electrical output cable connected to the electrical generator and configured to transmit generated electricity for external or grid usage;
  a radial clamping system removably coupled with the marine craft; and
  at least one clamp arm secured to the radial clamping system at a proximal end of the radial clamping system and operatively coupled to the electrical generator at a distal end of the at least one clamp arm, wherein the at least one clamp arm is configured to secure the electrical generator in a spaced relationship with the marine craft such that a shaft of the electrical generator is substantially aligned with the propeller shaft.

17. A method of utilizing a nuclear-based marine craft to generate electricity for external or grid usage, the method comprising:
  providing a nuclear-based marine craft;
    the nuclear-based marine craft comprising:
      a propeller shaft; and
      a propeller;
  removing the propeller from the marine craft;
  providing an electrical generator external to the nuclear-based marine craft; the electrical generator comprising a shaft;
  mounting the electrical generator external to the marine craft by:
    removably securing a radial clamping system to the marine craft;
    securing a proximal end of clamp arms to the radial clamping system; and
    securing a distal end of the clamp arms to the electrical generator, such that the electrical generator is secured in a spaced relationship with the marine craft and the shaft of the electrical generator is substantially aligned with the propeller shaft;
  providing an electrical output cable coupled with the electrical generator and configured to transmit generated electricity for external or grid usage; and
  generating electricity with the electrical generator by operation of the nuclear-based marine craft by rotating the generator shaft with the propeller shaft.

* * * * *